United States Patent Office 3,567,673
Patented Mar. 2, 1971

3,567,673
BIPHENYL MODIFIED POLYESTERIMIDE
WIRE ENAMEL
Lionel J. Payette, Scotia, N.Y., assignor to
General Electric Company
No Drawing. Filed Nov. 12, 1968, Ser. No. 775,194
Int. Cl. C08f 45/28
U.S. Cl. 260—33.6
5 Claims

ABSTRACT OF THE DISCLOSURE

Polyesterimide base coating solutions having biphenyl as an additive are characterized by improved wire coating capability.

---

This invention relates to polyesterimide base coating compositions. More particularly, it relates to such compositions which are characterized by improved ability to provide coated wires having good build roundness, concentricity, smoothness and continuity as well as ease and facility of application.

Polyesterimide base coating compositions are well known, such compositions containing a polymer base containing both ester and imide groups in a suitable solvent and having added thereto in many cases other materials such as organic titanates or other curing agents to accelerate curing, polyisocyanates to improve the curing and thermal characteristics and phenolic resins such as phenol aldehyde resin to improve the physical characteristics such as flexibility. Also added may be various metals such as cerium, cobalt, manganese, zinc, iron, lead, zirconium and the like and mixtures thereof which have been found to variously improve the smoothness of cured coatings produced from the compositions, their flexibility, temperature resistance and abrasion resistance, among other characteristics.

Such polyesterimide coating compositions are discussed widely in the literature including British Pats. Nos. 973,377; 1,028,887; 1,043,098; 1,095,663 and 1,082,181, included herein by reference, among others. Generally speaking, polyesterimides can be prepared simply by introducing an imide group or imide group producing moiety into a polyester structure. There is taught in U.S. Pat. No. 2,936,296, included herein by reference, the preparation of polyesters derived from dihydric alcohol, polyhydric alcohol containing at least three hydroxyl groups and acidic constituent such as isophthalic or terephthalic acid or mixtures thereof, or lower alkyl dialkyl esters of such materials. Specifically, the above U.S. Pat. No. 2,936,296 teaches the preparation of polyester resins from ingredients including (a) from about 25 to 56 equivalent percent, preferably from 36 to 50 equivalent percent of isophthalic or terephthalic acid or mixtures thereof, or lower dialkyl esters of these materials, (b) from about 15 to 46 equivalent percent, preferably from about 25 to 40 equivalent percent, of a diol such as ethylene glycol, and (c) from about 13 to 44 equivalent percent, preferably from 20 to 32 equivalent percent, of a saturated polyhydric alcohol having at least three hydroxyl groups. Typical of the isophthalic and terephthalic acid esters which can be used are those dialkyl esters containing from one to eight, preferably from one to four, carbon atoms including dimethyl, diethyl, dipropyl, dibutyl, etc. esters. The terms "polyhydric alcohol" and "saturated aliphatic polyhydric alcohol having at least three hydroxyl groups" include both polyhydric alcohols in which the hydroxyl groups are connected by a plurality of carbon-to-carbon linkages, as well as other alcohols having three or more hydroxyl groups, such as glycerine, 1,1,1-trimethylolethane, sorbitol, mannitol, diglycerol, trimethylolpropane, dipentaerythritol, tris (2-hydroxyethyl) isocyanurate, etc. The ethylene glycol can be replaced in whole or in part by other diols including but not limited to butane-diol, neopentyl-diol, pentane-diol, and the like.

The term "equivalent percent" is used in its usual sense herein, it being the number of equivalents of the reactant divided by the total number of equivalents of all reactants times 100. The number of equivalents, then, is the number of moles of the reactant multiplied by the number of functional groups, such as carboxyl, ester, hydroxyl, isocyanate, etc. Thus, the equivalents of dimethyl-terephthalate is the number of moles of this material multiplied by two; for glycerine, the number of moles times three; and for ethylene glycol, the number of moles times two.

It has been found that polyesterimide resins can be very readily prepared by substituting for a part of the acidic constituent, such as the isophthalic acid or terephthalic acid or derivatives as above, an imide group producing constituent. This can conveniently be accomplished, for example, by including in the polyester ingredients a primary amine and a tricarboxylic anhydride or tetracarboxylic dianhydride which will react to produce imide groups within the polyester structure. Alternatively, the imide group producing material can be prepared separately as taught in the prior art such as British Pat. No. 973,377 by first reacting the primary amine and the anhydride to produce a diamino diacid material which can then be reacted with the other polyester ingredients.

Primary amines useful in conjunction with the present invention are listed in the above patents, as well as such patents as U.S. 3,179,614 and 3,179,634, among others. This primary amine contains, in addition to the primary amino group, at least one additional reaction group which can also be a primary amino group or a carboxyl group or a hydroxyl group. Such materials as amino salts, amides, lactams or polyamides can also be used so long as the primary amino group is capable of forming an imide group. Among the preferred amines are methylene dianiline and oxydianiline. While trimellitic anhydride is very useful, other tricarboxylic acid anhydrides which will occur to those skilled in the art can also be used as well as tetracarboxylic acid dianhydrides and other polyanhydrides, among which are those listed in U.S. Pats. Nos. 3,179,614 and 3,179,634, among others. Also useful in the preparation of polyesterimides are the ester group containing polyanhydrides described in U.S. Pats. Nos. 3,182,073 and 3,182,074. The use also of amide group producing constituents in addition to the ester and imide group producing ingredients is not precluded.

As pointed out above, it has been found that the addition of various materials to the basic polyesterimide enhances its use as a coating composition. Generally speaking, the polyesterimide ingredients are reacted in a suitable solvent such as cresylic acid, cresylic acid-phenol mixtures, and the like with or without the addition of high boiling hydrocarbon solvents, by heating at about 130° C. for about two hours and then at a temperature of from about 190° C. to 225° C. for from about 4 to 8 hours. Final solids adjustment is made with similar solvents. As pointed out above, the imide group donor can be prepared separately or its precursors included with the polyester ingredients.

It has been found desirable to add to the polyesterimide base about 0.5% to 3%, based on the weight of the solids, of an organic titanate such as tetrabutyl titanate as a curing aid. Among the organic esters of titanium which have been found useful in connection with the invention are those corresponding to the general formula $$Ti(OR)_4$$

wherein R is a radical selected from the group consisting of the saturated and unsaturated aliphatic hydrocarbon radicals, for example, methyl, ethyl, etc., and vinyl, alkyl, etc., aryl, aralkyl, alkaryl and cycloaliphatic radicals. Specifice examples of esters of ortho titanic acids which may be employed include those substituted by methyl, ethyl, propyl, isopropyl, n-butyl, isobutyl, secondary butyl, tertiary butyl, etc. radicals, vinyl, allyl, butenyl radicals, etc., phenyl, naphthyl, benzyl, cinnamyl and substituted phenyl or naphthyl, tolyl, xylyl and phenylethyl radicals, various cycloaliphatic esters such as tetracyclohexyl. These compounds may comprise, in addition, mixed esters having two or more different radicals of the group enumerated. It will be understood, of course, that mixtures of such titanates can be used and the terms "titanate," "organic titanium ester material" or "organic titanium ester" will be understood to include mixtures thereof.

The cross linking or curing of the polyesterimide is also further improved by the addition thereto of a polyisocyanate. Any of the usual isocyanates can be used in conjunction with the present invention including, for example, those mentioned in U.S. Pat. No. 3,249,578, and particularly those blocked isocyanates known as Mondur–S and Mondur–SH, among others. Generally speaking, such isocyanates are added in amounts ranging from about one percent to five percent, based on the weight percent of the total solids in the final wire enamel.

While the metal can be added in any compatible form, the soaps or organic salts of the metal such as the naphthenate, octoate and the like are preferred. Generally, from about 0.1% to 0.5% by weight of the metal as such is used based on the weight of the total solids in the composition.

The properties of the polyesterimide base coating composition are also improved as with respect to flexibility and the like by the addition thereto of from 1 to 15 percent based on the weight of the coating composition of a phenol aldehyde resin, typically a phenol formaldehyde resin.

While polyesterimide base coating compositions such as those described have found widespread use in the art, particularly that pertaining to the coating and insulation of electrical conductors or magnet wire, the cured coatings produced by such coating compositions have been found to be deficient in smoothness, roundness, concentricity and continuity, and it is accordingly a primary object of the present invention to provide a means for preparing such coating compositions which are improved with respect to such properties.

Briefly, it has been found according to the present invention that coating compositions of the polyesterimide base type are substantially improved by the addition to the composition of from about 0.5% to 8% by weight of biphenyl based on the total weight of the composition or solution. The addition of such material as a solvent results in wire coatings having improved concentricity, smoothness and continuity. Such compositions can also be applied while retaining such improved characteristics at high speeds and at higher curing tower temperatures.

Those features of the invention which are believed to be novel are set forth with particularity in the claims appended hereto. The invention will, however, be better understood and further objects and advantages thereof seen from a consideration of the following description.

The following example illustrates the practice of the present invention and is not to be taken as limiting in any way except where so specifically limited. All parts and percentages are by weight except where specifically stated otherwise.

EXAMPLE 1

There was prepared a typical polyesterimide by mixing in 10.87 parts of cresylic acid, 2.01 parts of ethylene glycol along with 8.57 parts dimethyl terephthalate, 3.74 parts methylene dianiline, 7.27 parts trimellitic anhydride and 10.98 parts tris(2-hydroxyethyl)isocyanurate along with 0.05 part of tetrabutyl titanate as a catalyst. The mixture was heated at about 130° C. for about two hours and then at about 200° C. to 220° C. for about four hours.

The polyesterimide base prepared as above was cut with 23.9 parts of a mixture of 45 percent by volume cresylic acid and 55 percent by volume phenol and 19 parts of Humble solvent 6324 and cooled to 130° C. Humble 6324 is a hydrocarbon solvent having a mixed aniline point of 11.0, a distillation range of from about 288° F. to 346° F. and comprises a mixture of mono-, di-, and trialkyl (primarily methyl) benzenes. There was then cold blended into the mixture 1.73 parts of polyisocyanate, specifically Mondur-SH, and 1.75 parts of phenol formaldehyde resin in the form of a 40 percent solids solution in cresylic acid. There was also added .96 part of tetrabutyl titanate and .3 percent of cobalt as metal in the form of cobalt naphthenate, these amounts being based on the weight of the total solids in the coating composition.

Coating composition as above was coated on a .0403" diameter (18 AWG) copper wire, the curing taking place in a wire tower having a top temperature of 470° C. and a bottom temperature of 250° C. The wires so coated were then subjected to various tests which are well known to those skilled in the art. The wires were critically examined for smoothness as was the continuity of the coating as measured by the number of failures per 100 feet at an electrical potential of 3000 volts.

Shown in the table below are the results of the tests carried out as described above on the composition of Example 1 as well as on similar compositions having the indicated added percentage by weight amount of biphenyl and other solvent additives.

TABLE

| Example: | Passes | Build, mils | Additive solvent, percent by weight | Speed, f.p.m. | Surface characteristics | Continuity (breaks/100 ft. at 3 kv.) |
|---|---|---|---|---|---|---|
| 1 | 6 | 2.9-3.1 | 73151, 0% biphenyl | 32 | Rough, C | 21 |
|   |   |   |   | 36 | Blisters, C+ | 13 |
| 2 | 6 | 2.9-3.1 | 73151, .5% biphenyl | 32 | Smooth, B+ | 2 |
|   |   |   |   | 36 | ----do---- | 2 |
| 3 | 6 | 2.9-3.1 | 73151, 1.0% biphenyl | 32 | Smooth, B | 1 |
|   |   |   |   | 36 | ----do---- | 2 |
| 4 | 6 | 2.9-3.1 | 73151, 1.5% biphenyl | 32 | Smooth, B+ | 2 |
|   |   |   |   | 36 | ----do---- | 1 |
| 5 | 6 | 2.9-3.1 | 73151, 2.0% biphenyl | 32 | Smooth, B+ | 1 |
|   |   |   |   | 36 | ----do---- | 3 |
| 6 | 6 | 2.9-3.1 | 73151, 4.0% biphenyl | 32 | Smooth, B+ | 3 |
|   |   |   |   | 36 | ----do---- | 3 |
| 7 | 6 | 2.9-3.1 | 73151, 8.0% biphenyl | 32 | Smooth, B+ | 5 |
|   |   |   |   | 36 | ----do---- | 5 |
| 8 | 6 | 2.9-3.1 | 73151 plus 2% solvesso 100 | 34 | Blisters | 100 |
| 9 | 6 | 2.9-3.1 | 73151 plus 2% heavy aromatic naphtha | 34 | ----do---- | 100 |
| 10 | 6 | 2.9-3.1 | 73151 plus 2% chlorinated biphenyl | 34 | ----do---- | 100 |

Other characteristics of the coatings such as flexibility after 25 percent stretch, snap elongation, solvent resistance, abrasion resistance, dissipation factor, heat shock, heat aging and cut-through temperature were satisfactory. It will be noted above that when no biphenyl was added, a rough coating resulted whereas when from about .5 percent to 8 percent of biphenyl was used as prescribed, the surface characteristics as tested visually and also by the lower number of breaks per 100 ft. was satisfactory. Generally speaking, blistering or surface roughness of C+ or worse or one having more than 10 breaks per 100 ft. at 3 kv. cannot be countenanced. On the other hand, it was found that when over about 8 percent of the biphenyl was used, it tended to build up as a solid at the top of the tower.

The use of the present invention also permits the running of polyesterimide wire enamels at higher than usual speeds. For example, when the above polyesterimide without biphenyl was run through a tower having a bottom temperature of 220° C. and a top temperature of 480° C. at speeds varying from 31 to 34 ft./min. with six passes to give a build of 3.0 mils, the concentricity of the coating on 0.0403 diameter copper wire ranged from 2:1 to 3:2. On the other hand, when 4 percent biphenyl was added as taught above, speeds varying from 31 to 38 ft./min. gave a much better concentricity of 5:4.

Further illustrative of the efficacy of the present invention is the following.

When the above polyesterimide without the biphenyl additive was coated on a 0.032" diameter copper wire in eight passes at a speed of 36 to 44 ft./min. and at the above curing temperatures to give a build of about 3.0 mils, the concentricity of the resulting coating was 3:1. However, when 4 percent biphenyl was added and the wire was coated in six passes to a build of about 3.0 mils at speeds of from 44 to 53 ft./min., the concentricity was a very acceptable 5:4.

There are provided by the present invention polyesterimide wire enamels or coating solutions which can be applied to wire at higher than normal speeds and curing temperatures to provide cured coatings which are smooth and even and are characterized by good concentricity. Such characteristics along with good electrical insulating capability make them particularly acceptable in the electrical arts.

What I claim as new and desire to secure by Letters Patent of the United States is:

1. A polyesterimide base wire enamel solution containing from about 0.5 to 8 percent of biphenyl based on the weight of the solution.

2. A polyesterimide base wire enamel solution as in claim 1 which contains an amount of polyisocyanate sufficient to cross-link said polyesterimide.

3. A polyesterimide base wire enamel solution as in claim 2 which contains an amount of organic titanate to act as a curing aid for said polyesterimide.

4. A polyesterimide base wire enamel solution as in claim 3 which contains an amount of phenol aldehyde resin sufficient to improve the flexibility of the cured wire enamel.

5. A polyesterimide base wire enamel solution as in claim 4 which also contains organic salt of a metal selected from cerium, cobalt, manganese, zinc, iron, lead, zirconium and mixtures thereof in an amount sufficient to improve the smoothness, flexibility and temperature and abrasion resistance of the cured enamel.

References Cited
UNITED STATES PATENTS
3,426,098   2/1969   Meyer et al. _____ 260—78TF MORRIS LIEBMAN, Primary Examiner S. M. PERSON, Assistant Examiner U.S. Cl. X.R.

106—285; 117—232; 260—78